United States Patent [19]

Wade

[11] 3,933,676

[45] Jan. 20, 1976

[54] STABILIZED AQUEOUS SOLUTIONS OF SODIUM BOROHYDRIDE

[75] Inventor: Robert C. Wade, Ipswich, Mass.

[73] Assignee: Ventron Corporation, Beverly, Mass.

[22] Filed: Apr. 8, 1974

[21] Appl. No.: 459,058

[52] U.S. Cl. .................... 252/188; 8/110; 162/83; 252/105; 423/286; 423/515
[51] Int. Cl.² ...................... C09K 3/00; D21C 3/04
[58] Field of Search .............. 252/188, 105; 162/83; 8/110; 423/515, 286

[56] References Cited
UNITED STATES PATENTS

| | | | |
|---|---|---|---|
| 984,312 | 2/1911 | Stiegelmann et al. | 252/188 |
| 1,710,310 | 4/1929 | Helwig | 252/188 |
| 2,970,114 | 1/1961 | Bragdon | 252/188 |
| 3,167,515 | 1/1965 | Hinckley et al. | 252/188 |
| 3,259,457 | 7/1966 | Sauls et al. | 252/188 |
| 3,536,445 | 10/1970 | Hansley et al. | 252/188 |
| 3,538,012 | 11/1970 | Goerrig | 252/188 |
| 3,653,804 | 4/1972 | Janson et al. | 252/188 |
| 3,669,895 | 6/1972 | Shastri | 252/188 |
| 3,773,679 | 11/1973 | Kise et al. | 252/188 |
| 3,804,944 | 4/1974 | Kise et al. | 252/188 |

OTHER PUBLICATIONS

Chemical Abstracts, Vol. 67, No. 65581t (1967).

Primary Examiner—Benjamin R. Padgett
Assistant Examiner—T. S. Gron
Attorney, Agent, or Firm—J. Harold Boss, Esq.

[57] ABSTRACT

This invention relates to stabilized aqueous solutions of sodium borohydride containing soluble zinc in the form of sodium zincate. They may contain from about 35 to about 46.9 percent sodium hydroxide and from about 9.35 to about 12.9 percent sodium borohydride and 0.5 to 3 percent zinc which is preferentially added as zinc oxide and reacted with the sodium hydroxide present in the solution to form sodium zincate. These solutions may be used to react with sodium bisulfite to form solutions of sodium hydrosulfite in excellent yield. Such hydrosulfite solutions do not form trace amounts of hydrogen sulfide and do not darken or corrode copper based paper machine wires in contrast to hydrosulfite solutions which contain no soluble zinc.

2 Claims, No Drawings

STABILIZED AQUEOUS SOLUTIONS OF SODIUM BOROHYDRIDE

Stabilized aqueous solutions of sodium borohydride described in the United States patent to Robert W. Bragdon No. 2,970,114, dated January 31, 1961 have become an important item of commerce. Illustrative compositions are shown in the following table.

| Percent NaOH | Percent NaBH$_4$ |
| --- | --- |
| 35.0 | 9.35 |
| 40.0 | 11.00 |
| 46.9 | 12.9 |

These solutions contain 1–2 percent sodium borate as an impurity.

One of the most important uses for these solutions has been the generation of sodium hydrosulfite solutions which are used to brighten groundwood pulps. The chemistry of the process is represented by the following equation:

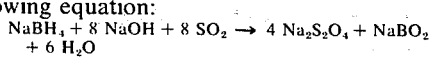

$$NaBH_4 + 8\ NaOH + 8\ SO_2 \rightarrow 4\ Na_2S_2O_4 + NaBO_2 + 6\ H_2O$$

This process is discussed in greater detail in the following publications:

P. Luner, R. LaPlaine, R. C. Wade, "Reductive Bleaching with Sodium Borohydride: Formation of Hydrosulfite in Situ," Pulp & Paper Mag. Canada 65, No. C; T101- T106 (1969).

Goodart, Ty, "Third Generation Hydrosulfite Seen as Zinc Hydrosulfite Replacement," Paper Age, April 1972.

F. B. Sellers, "Installation and Operation of Borol Bleaching System for Groundwood," Midwest Technical Section Paper, Canadian Pulp & Paper Association, Mar. 2, 1973.

Under certain conditions not completely understood at this time, bleaching solutions containing sodium hydrosulfite when added to groundwood pulps can form trace amounts of hydrogen sulfide. This hydrogen sulfide can collect in the "dead air spaces" of the groundwood system and be present up to 200 parts per million of the atmosphere. This is objectionable to the operating personnel in the mill. Likewise a small amount of H$_2$S may remain dissolved in the process water which ultimately comes in contact with the paper machine wires. Where these wires are formed from copper based metals, darkening, corrosion and premature failure may result. This is very undesirable also.

As a solution of these problems it has been proposed to bleach groundwood pulp with sodium hydrosulfite solutions stabilized by the use of at least 5% by weight of sparingly soluble zinc compounds in solid phase based on the sodium hydrosulfite as described in U.S. Pat. No. 3,653,804. This patent states, beginning on line 74 of column 2, "It evidently requires the solid phase of the sparingly soluble zinc compound to bind traces of hydrogen sulfide formed."

It has also been proposed to stabilize sodium hydrosulfite solutions against decomposition by adding up to 16% of CdSO$_4$.8H$_2$O based on the sodium hydrosulfite to the bleach solution. (Ref.: M. Wayson, C. B. Anderson, W. J. Lem, and W. H. Rapson, TAPPI 52, 89–92 (1969). Because of its high toxicity cadmium may not be used in paper making processes where it would be discharged with the effluent water.

I have now discovered that improved stabilized aqueous solutions of sodium borohydride can be prepared by reacting and dissolving in the stabilized aqueous sodium borohydride solutions, prepared as described in the previously mentioned patent to Bragdon U.S. Pat. No. 2,970,114, any zinc compound which will form sodium zincate with the sodium hydroxide present in the solution. These improved solutions contain 0.5 to 3 percent zinc calculated as the element. As illustrative of zinc compounds which may be used in preparing these improved solutions, I may mention zinc acetate, zinc chloride, and zinc oxide. Even zinc metal as a fine powder is suitable as it reacts slowly with aqueous sodium hydroxide to form sodium zincate and hydrogen. However, I prefer to use zinc oxide to form the sodium zincate since it introduces no extraneous anions, it dissolves easily and is the least expensive source of zinc.

In the practice of the invention I prefer to dissolve 0.5 to 3 percent zinc calculated as the element in substantially saturated solutions containing 11 to 12.9 percent sodium borohydride, 40–46.9 percent sodium hydroxide, and the balance water. It may also contain 1 to 2 percent sodium borate as an impurity. As items of commerce it is desirable that these solutions be as completely saturated with sodium borohydride and sodium hydroxide as possible since the costs of shipping are based upon the total weight of the solutions.

The preferred method of incorporating the zinc into these solutions is to add the required amount of zinc compound, for example 3.7 grams of zinc oxide to 96.3 grams of the saturated stabilized aqueous sodium borohydride solution, warm to about 80°C. with stirring until the zinc compound reacts with the sodium hydroxide to form sodium zincate and dissolves. The resulting solution may be cooled without any precipitation or gelation occurring — even on prolonged storage at 4°C. No decomposition of the sodium borohydride in the solution occurs either during the formation and solution of the sodium zincate or on later storage of this solution greater than that described in U.S. Pat. No. 2,970,114.

I have found that these improved stabilized aqueous solutions of sodium borohydride and sodium hydroxide may be used to generate sodium hydrosulfite by the previously mentioned process which are useful for bleaching groundwood pulps and which do not form trace amounts of hydrogen sulfide in the system.

In actual practice, one pound of the saturated stabilized solution of the invention when reacted with sodium bisulfite or SO$_2$ and additional sodium hydroxide will form at least 2.5 pounds of sodium hydrosulfite. Therefore, the zinc present based on sodium hydrosulfite is 3.0%/2.5 equals 1.2% zinc which is equivalent to 1.6% zinc oxide. This is markedly less than the 5% zinc oxide claimed in U.S. Pat. No. 3,653,804. It is very important to keep the zinc content of these solutions at the lowest practical limit commensurate with completely reacting with the hydrogen sulfide because the amount of zinc which may be discharged from pulp and paper mills in severely limited. Zinc ions are undesirable in the environment.

The invention is illustrated further by the following specific examples.

EXAMPLES 1. 96.3 Grams of an aqueous solution containing about 12% $NaBH_4$, 42% NaOH and 1% $NaBO_2$ were heated to 80°C. on a hot plate in a Pyrex beaker. Zinc oxide (3.7 grams Mallinckrodt U.S.P. powder) was added gradually to the hot solution, with magnetic stirring. After 5 minutes, the ZnO had dissolved completely, with no sign of gas ($H_2$) evolution. Cooling to room temperature did not cause precipitation of any components. Storage for 4 days at 40°F. did not cause any change, viz. gas evolution or precipitation.

Actual analysis at a later date gave: 11.7% $NaBH_4$, 42.5% NaOH and 3.0% Zn (by EDTA titration). Equivalent results were obtained where 3.7% ZnO was dissolved in a solution containing 35% NaOH, 9.4% of $NaBH_4$, and 1% $NaBO_2$.

2. A solution was prepared on a 1-gallon scale, using 5307 grams of the solution containing about 12% $NaBH_4$, 42% NaOH and 1% $NaBO_2$ and 205.6 grams ZnO in a 6-liter stainless steel beaker equipped with a mechanical stirrer. Stirring and heating were continued until the zinc oxide had dissolved (approximately 1 hour). The solution was then cooled and used to generate a 1.5% sodium hydrosulfite solution by reaction with additional NaOH and $SO_2$ dissolved in water. There were no problems using this improved stabilized sodium borohydride solution containing sodium zincate. Yields of sodium hydrosulfite were equal to those obtained from the stabilized aqueous solution containing no sodium zincate.

3. About 1.5% sodium hydrosulfite solutions generated from stabilized aqueous sodium borohydride solutions containing about 12% $NaBH_4$, 42% NaOH, 1% $NaBO_2$ were prepared by reaction with requisite amounts of NaOH and $SO_2$. On standing about 1 hour, $H_2S$ could be detected in minute amounts in the solution and in the atmosphere over the solution. Test coupons of brass and bronze paper machine wires were immersed in this sodium hydrosulfite solution. Darkening of these coupons due to copper sulfide formation on the surface typically occurred within 4 to 5 hours.

4. The 1.5% sodium hydrosulfite solution from example 2 which also contains about 0.02% Zn or 0.025% ZnO in the form of sodium zincate gave no odor on qualitative test for even trace amounts of $H_2S$ in the atmosphere above the solution or in the solution itself. Furthermore, no darkening of the brass and bronze wire test coupons occurred even after 3 days of immersion.

I claim:

1. A stabilized aqueous sodium borohydride solution comprising from about 35 to about 46.9 percent of sodium hydroxide, from about 9.35 to about 12.9 percent sodium borohydride, zinc in an amount of 0.5 to 3 percent in the form of dissolved sodium zincate, and the balance water.

2. A stabilized aqueous sodium borohydride solution comprising about 40 to about 46.9 percent sodium hydroxide, about 11 to about 12.9 percent sodium borohydride, zinc in an amount of 0.5 to 3 percent in the form of dissolved sodium zincate, and the balance water.

* * * * *